(12) United States Patent
Wong

(10) Patent No.: US 9,413,734 B1
(45) Date of Patent: Aug. 9, 2016

(54) METHODS AND APPARATUS FOR SHARING ENCRYPTED DATA

(71) Applicant: Sze Yuen Wong, Herndon, VA (US)

(72) Inventor: Sze Yuen Wong, Herndon, VA (US)

(*) Notice: Subject to any disclaimer, the term of this patent is extended or adjusted under 35 U.S.C. 154(b) by 0 days.

(21) Appl. No.: 14/616,746

(22) Filed: Feb. 9, 2015

(51) Int. Cl.
*G06F 21/62* (2013.01)
*H04L 29/06* (2006.01)

(52) U.S. Cl.
CPC .......... *H04L 63/061* (2013.01); *G06F 21/6227* (2013.01); *H04L 63/0457* (2013.01); *H04L 63/0876* (2013.01)

(58) Field of Classification Search
None
See application file for complete search history.

(56) References Cited

U.S. PATENT DOCUMENTS

| | | | | |
|---|---|---|---|---|
| 8,429,421 | B2 * | 4/2013 | Chase | G06F 21/6227 380/277 |
| 2006/0053112 | A1 * | 3/2006 | Chitkara | G06F 17/30595 |
| 2009/0119518 | A1 * | 5/2009 | Staddon | G06F 21/6227 713/193 |
| 2013/0238646 | A1 * | 9/2013 | Maro | G06F 21/6227 707/758 |

* cited by examiner

*Primary Examiner* — Minh Dinh

(57) ABSTRACT

The present invention is directed to methods and systems in which data are stored as encrypted records on a computer usable medium, and search requests are processed based on user identities to retrieve the data without decrypting all the stored records. Individual decryption keys are associated with identities of respective owners, without being revealed to the owners and are kept internal inside a computer. Finally, all keys are overwritten from the computer usable medium upon completion of each search request to take access away from a superuser or any unauthorized access to the system.

3 Claims, 7 Drawing Sheets

Illustrates Flow of Registering a plaintext into a Trust No One Data Store

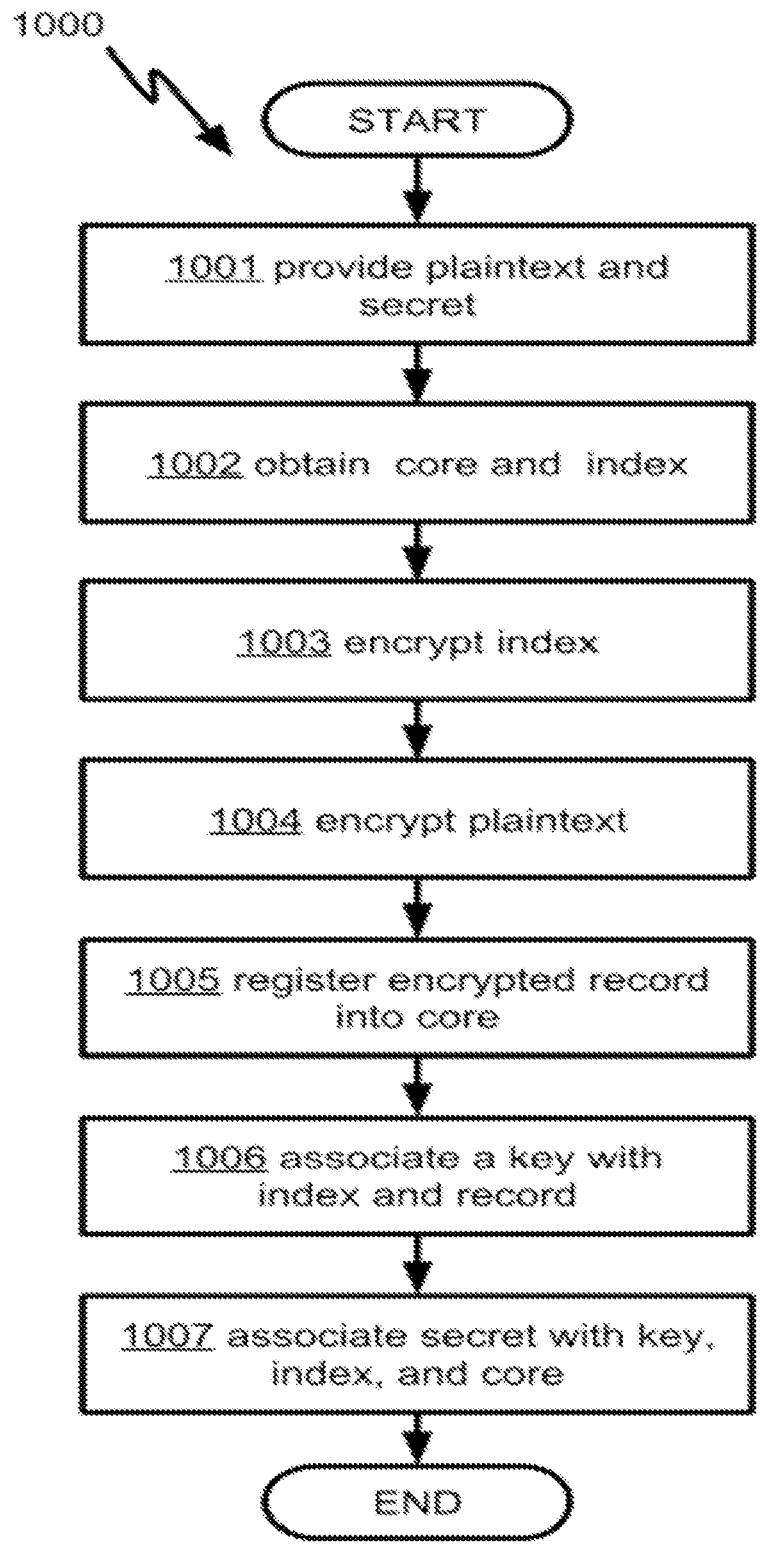
Fig.1 Illustrates Flow of Registering a plaintext into a Trust No One Data Store

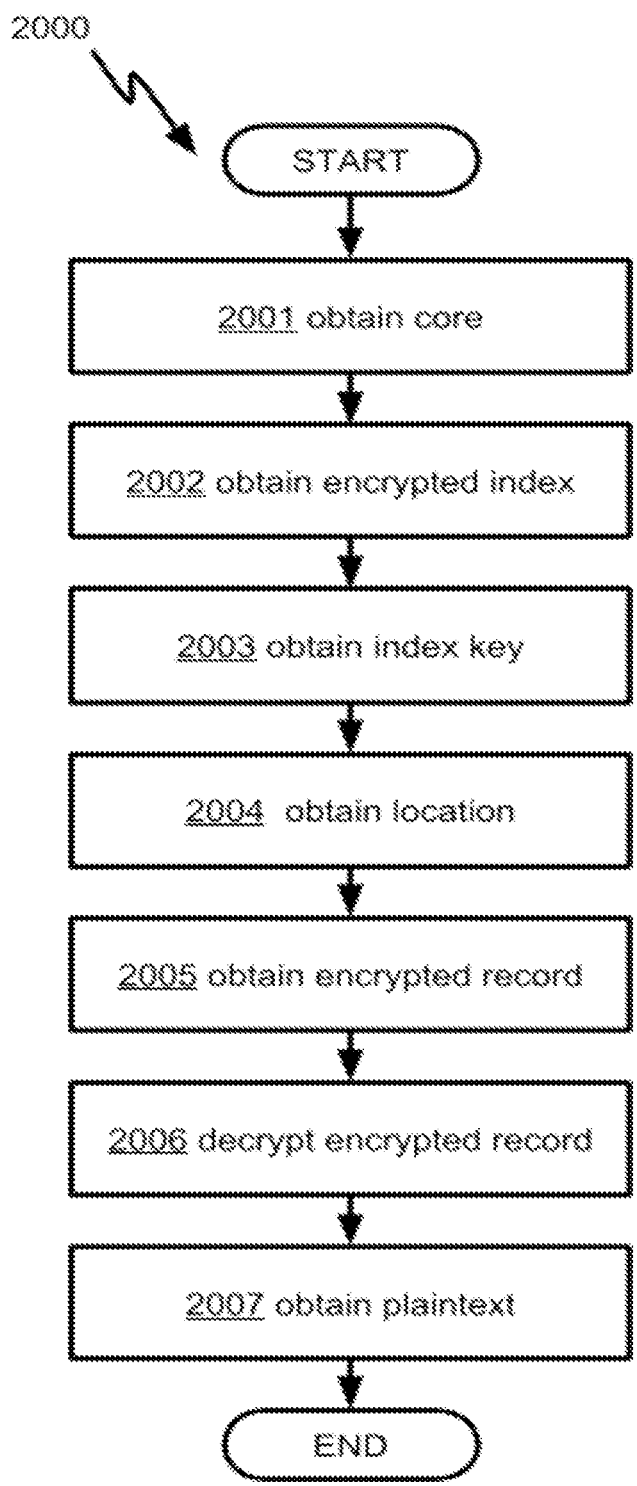
Fig. 2 Illustrates confidential data search flow

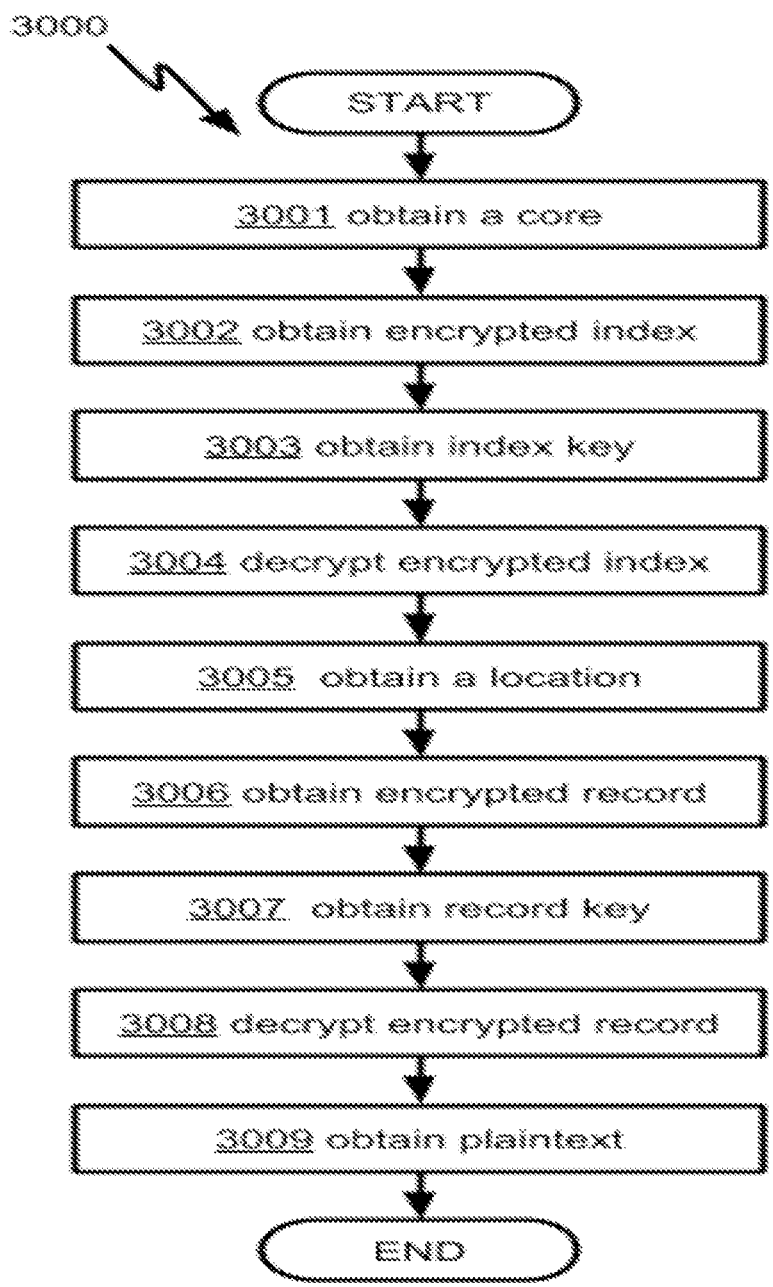
Fig. 3 Illustrates confidential data retrieval flow, using different keys to decrypt index and record

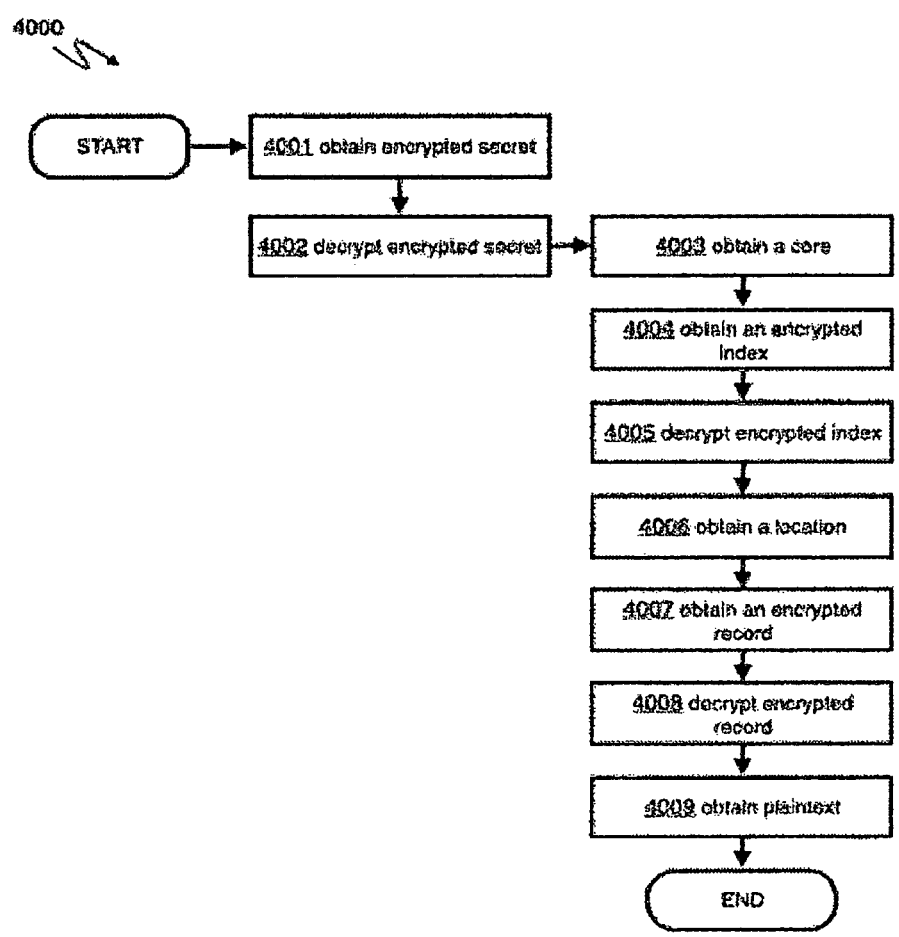
Fig. 4 Illustrates confidential data retrieval flow using an identity

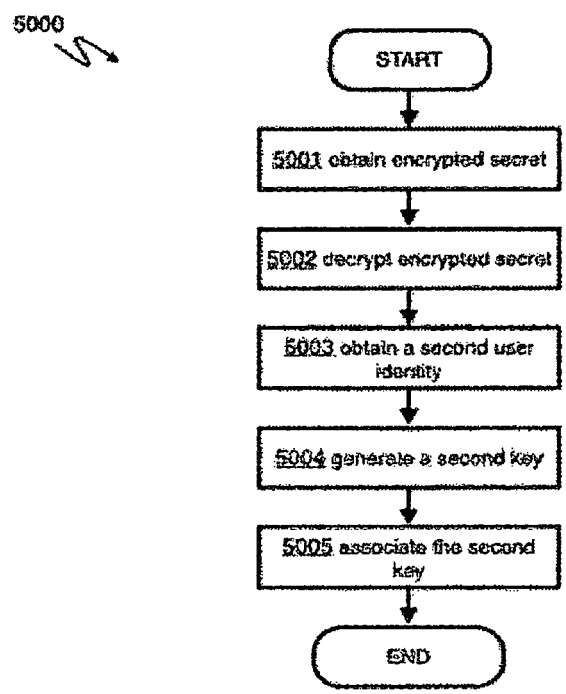
Fig. 5 Illustrates flow of sharing data access among users

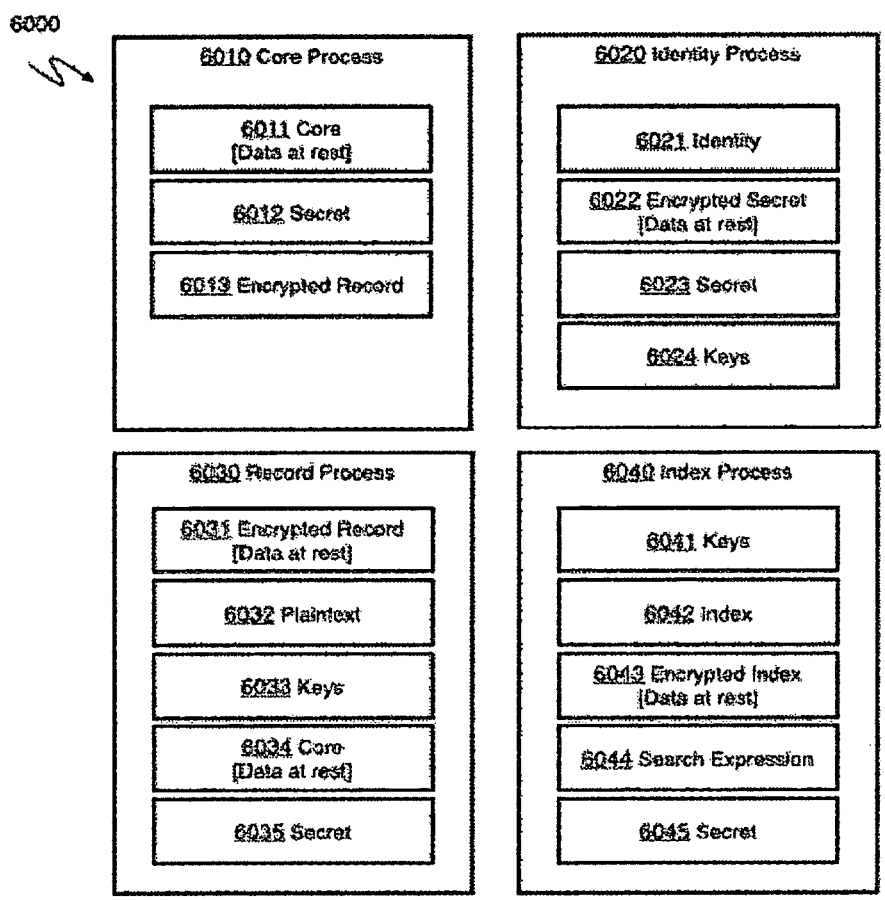
Fig. 6 Illustrates data at rest and their use in various processes.

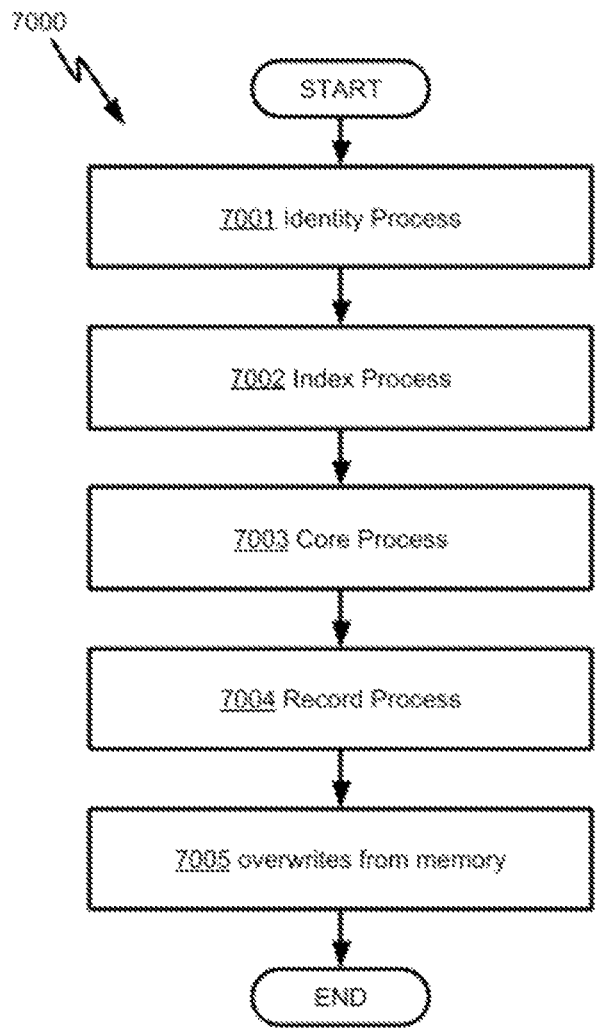
Fig.7 Illustrates flow of overwriting non-encrypted data upon completion of search requests

METHODS AND APPARATUS FOR SHARING ENCRYPTED DATA

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The field of the invention relates to software for confidential retrieval of encrypted data.

BACKGROUND OF THE INVENTION

With the explosion of Big Data, complex search queries can be slow when running against SQL database. The performance issue roots from the fact that very simple wildcard-based text search required full table scans which results in degradation of the site's overall performance.

Apache Lucene is a free open source information retrieval software library. Along with the Apache Solr which is the open source enterprise search platform were introduced to address this issue. Apache Lucene/Solr are made for any application which requires full text indexing and searching capability. They are widely recognized for its utility in implementation of Internet search engine and local, single-site searching. Solr is able to achieve fast search responses by searching on indexes rather than on texts.

Apache Solr core manages a single index. An index is a set of all data used to store information about document to be searched. Only one core is loaded at a time. A single Solr instance is capable of managing multiple indexes hence the name Multi-Core.

By default, users that have access to one of the cores may also be able to access other cores. Such lack of access control may not be desirable as it allows users to perform searches on unauthorized data that may not belong to them.

The Trust No One design philosophy requires that a owner of encrypted data should always remain in control of decrypting the data, and no third party can access the decryption without obtaining authorization from the owner.

To apply the Trust-No-One philosophy in designing a data store, a security model is needed to offer security from 3 different dimensions, namely, data-at-rest trust, superuser trust, and owner trust.

Data-at-rest trust: When data is at rest on a computer readable medium, it is subject to theft and unauthorized physical access to the computer. A conventional solution is to encrypt all data stored in the medium. One drawback of this approach is the need to decrypt all data each time a search request is processed, resulting in performance degradation that only gets worse with increasing data volume and amount of search requests.

Superuser trust: When data is encrypted in the above fashion, it is typically done by means of a superuser key, or the equivalence of a root access. The resulting trustworthiness of data-at-rest hinges on the the system key being trusted fully. In other words, data-at-rest is deemed untrustworthy as soon as the system key is compromised. The first drawback is the violation of trust, as the control of decryption falls into the hands of the superuser, instead of owners of the encrypted data. One alternative solution is to encrypt data by means of owner-keys instead. This approach presents a different drawback in the difficulty to process search requests, which would require decrypting all data by means of obtaining all the respective owner-keys, which is also a violation of trust among users.

Owner trust: yet another trust dimension is to restrict access to encrypted data by ownership. A search request is allowed to be processed only after its associated identity is successfully authenticated to be trustworthy, that the request is trusted to be originated by the data owner or a delegate with equivalent assigned privilege. One drawback is the tight coupling between the identity of an owner and the search request. Using a password authentication as an example, which is a commonly used challenge-response type of technique to authenticate the identity of a user. All it takes is a valid password to process search requests to access encrypted data under the privilege of the owner. One drawback of this approach is the lack of support for sharing access to data without sharing the password, and the sharing of a password results in compromising any trust that may have been associated with an identity.

With the increasing demand for a secure long-term massive data store, it is highly desirable for an invention that can provide a data store with the Trust No One security model, by addressing all of the aforementioned drawbacks.

SUMMARY OF THE INVENTION

The present invention is directed to methods and systems in which data are stored as encrypted records on a computer usable medium, and search requests are processed based on user identities to retrieve the data without decrypting all the stored records. Individual decryption keys are associated with identities of respective owners, without being revealed to the owners and are kept internal inside a computer. Finally, all keys are overwritten from the computer usable medium upon completion of each search request to take access away from a superuser or any unauthorized access to the system.

BRIEF DESCRIPTION OF THE DRAWINGS

FIG. 1 Illustrates Flow of Registering a plaintext into a Trust No One Data Store FIG. 2 Illustrates confidential data search flow FIG. 3 Illustrates confidential data retrieval flow, using different keys to decrypt index and record FIG. 4 Illustrates confidential data retrieval flow using an identity FIG. 5 Illustrates flow of sharing data access among users FIG. 6 Illustrates data at rest and their use in various processes FIG. 7 Illustrates flow of overwriting non-encrypted data upon completion of search requests

DETAILED DESCRIPTION OF THE INVENTION

FIG. 1 illustrates the flow of registering a plaintext into a Trust No One data store 1000. A user who is authorized to use the data store must have already obtained a secret representing the identity of the user is being trusted by the data store.

When a user provides a plaintext and the secret to the data store 1001, the data store in turn provides the plaintext to an Enterprise Search Engine for processing to obtain a core and an index 1002. A core, also known as a record set, is a data container typically used in an Enterprise Search Engine, such as APACHE SOLR, which is a common implementation of the Enterprise Search Engine technology. An Enterprise Search Engine typically registers data by creating index, such that all searches are subsequently done against the index. Further, the data store encrypts the index 1003, encrypts the plaintext to obtain an encrypted record 1004, and registers the encrypted record into the core 1005. Even further, the data store associates a key with decrypting the encrypted record and decrypting the encrypted index 1006, and then associates the secret with the key, the encrypted index, and the core 1007. In some other embodiments, it has been contemplated to use different keys for the decryption of the encrypted index and encryption record. It has also been contemplated to use the secret as the decryption key in some embodiments.

FIG. 2 illustrates the flow of searching for a plaintext from a Trust No One data store 2000. A user provides a search expression to the data store with an secret trusted by the data store. The data store uses the secret to obtain an associated core 2001 and an encrypted index 2002, and then uses the secret to obtain an associated key to decrypt the encrypted index 2003. The search expression is then processed against the index, resulting in a location 2004 that the data store uses to obtain an encrypted record from the core 2005. Further, the data store decrypts the encrypted record by using the key 2006 to obtain the plaintext 2007. A single key is used for decrypting both the index and the record in the preferred embodiments, although it has also been contemplated that in other embodiments, the secret may be associated with one key for decrypting the index, and a different second key for decrypting the record. Even further in some other embodiments, the secret itself may be used as a decryption key.

FIG. 3 illustrates the flow of searching for a plaintext from a Trust No One data store, where two different keys are used for decryption of the index and the record 3000. A user provides a search expression to the data store with an secret trusted by the data store. The data store uses the secret to obtain an associated core 3001 and an encrypted index 3002, and then uses the secret to obtain a first associated key 3003 to decrypt the encrypted index 3004. The search expression is then processed against the index, resulting in a location 3005 that the data store uses to obtain an encrypted record from the core 3006. Further, the data store obtains a second key associated with the secret 3007, and uses the second key to decrypt the encrypted record 3008 to obtain the plaintext 3009.

FIG. 4 illustrates the flow of searching for a plaintext from a Trust No One data store, where a user begins by providing a trusted identity and a search expression 4000. Instead of a secret being provided to the data store, the data store uses the identity to obtain an encrypted secret that is associate with the identity 4001, and obtain a key also associated with the identity to decrypt the encrypted secret 4002. The secret is then used to obtain an associated core 4003 and an associated index 4004. Further, the data store uses a key associated with the secret to decrypt the encrypted index 4005, processes the search expression against the index to obtain a location 4006, and then obtains an encrypted record from the core at the location 4007. Further, the data store uses the key to decrypt the encrypted record 4008 to obtain the plaintext 4009. While in the preferred embodiments, an identity is associated with a decryption key, it has been contemplated in some other embodiments to use the identity itself as a decryption key.

FIG. 5 illustrates the flow of sharing data access among users, where both users authorized to have obtained trusted identities from a Trust No One data store 5000. A first user provides a trusted identity to the data store, which obtains an encrypted secret associated with the identity 5001, and also obtains a first key associated with the identity. The first user also provides to the data store a second user as a recipient for the shared access. The data store obtains identity of the second user 5003, generates a second key based on the first key 5004, and associates the second key with the identity of the second user 5005. Generating a different second key allows the first user to remain in control of the first key, which allows the Trust No One data store to share data access without sharing keys while maintaining integrity of owner trust.

FIG. 6 illustrates a structural view of various data types in a Trust No One data store 6000. There are four processes running in the data store, namely, Core Process 6001, Identity Process 6002, Record Process 6003, and Index Process 6004. The Core Process 6010 manages associations between cores 6011, secrets 6012, and encrypted records 6013. The process supports obtaining an associated core of a given secret, and is responsible for overwriting secrets from all computer usable medium upon completion of search requests, while leaving cores on the medium. The Identity Process 6020 manages associations among identities 6021, encrypted secrets 6022, secrets 6023, and keys 6024. The process supports obtaining keys from identities for decrypting associated encrypted secrets, and is responsible for overwriting identities, secrets, and keys from all computer usable medium upon completion of search requests, while leaving encrypted secrets on the medium. The Record Process 6030 manages associations among encrypted records 6031, plaintexts 6032, keys 6033, cores 6034, and secrets 6035. The process supports obtaining keys from secrets, obtaining encrypted records from cores, and is responsible for overwriting plaintexts, keys, and secrets from all computer usable medium upon completion of search requests, while leaving encrypted records and cores on the medium. The Index Process 6040 manages associations among keys 6041, indexes 6042, encrypted indexes 6043, search expressions 6044, and secrets 6045. The process supports obtaining keys from secrets, obtaining encrypted indexes from secrets, and is responsible for overwriting keys, indexes, search expressions, and secrets from all computer usable medium upon completion of search requests, while leaving encrypted indexes on the medium. By always overwriting non-encrypted data and keys, the superuser trust is maintained and enforced by preventing compromise of data integrity from theft and unauthorized system access.

FIG. 7 illustrates a flow of the use of various data types during a search request, and the overwriting of the data types upon completion of the request 7000. The Identity Process 7001 uses an identity, a key associated with the identity, an encrypted secret, and a secret during the processing of a search request. Upon completion of processing, the identity, the key associated with the identity, and the secret are overwritten from all computer usable medium. Only the encrypted secret remains on the medium.

The Index Process 7002 uses the secret, a first key associated with the secret, an encrypted index, an index, a search expression, and a location during the processing of the search request. Upon completion of processing, the secret, the first key associated with the secret, the index, the search expression, and the location are overwritten from all computer usable medium. Only the encrypted index remains on the medium.

The Core Process 7003 uses the secret, the location, the core, and the encrypted record during the processing of the search request. Upon completion of processing, the secret and the location are overwritten from all computer usable medium. Only the core and the encrypted record remain on the medium.

The Record Process 7004 uses the encrypted record, the secret, a second key associated with the secret, and a plaintext during the processing of a search request. Upon completion of processing, the secret, the second key associated with the secret, and the plaintext are overwritten from all computer usable medium. Only the encrypted record remains on the medium.

In the preferred embodiments, all the above non-encrypted data and keys are all overwritten upon completion of a search request. It has been contemplated in other embodiments to overwrite immediately upon completion of each individual steps. Even further in other embodiments, it has also been contemplated to delegate the task of overwriting and reclaiming memory occupied to some automatic memory management processes.

PATENT CITATIONS

| Pat. No. | Issue Date | Inventor | Title |
| --- | --- | --- | --- |
| 8,856,158 | Oct. 7, 2014 | Feng Cao, Beijing (CN) | SECURED SEARCHING |
| 8,458,718 | Jun. 4, 2013 | Jonathan N. Hotra, St. Louis, MO (US) | STATICALLY PARTITIONING INTO FIXED AND INDEPENDENT SYSTEMS WITH FIXED PROCESSING CORE |

PATENT APPLICATION PUBLICATION CITATIONS

| Publication Number | Publication Date | Applicant | Title |
| --- | --- | --- | --- |
| U.S. 2014-0195804 A1 | Jul. 10, 2014 | SafelyLocked, LLC, Atlanta, GA (US) | TECHNIQUES FOR SECURE DATA EXCHANGE |

What is claimed is:

1. A data search method performed by a device comprising a computer usable medium that physically embodies a secret, a core, a plaintext, an encrypted record, a search expression for the plaintext, an index, an encrypted index, a first key, and a second key, wherein the method overwrites the secret, the plaintext, the expression, the index, the first key, and the second key from the medium, after performing the steps of:

processing the plaintext to obtain the core and the index, wherein the index is coupled with a location within the core;
encrypting the index;
encrypting the plaintext to obtain the encrypted record;
registering the encrypted record into the core at the location;
associating the first key with decrypting the encrypted record and the second key with decrypting the encrypted index;
associating the secret with the first key, the second key, the encrypted index, and the core;
obtaining the core associated with the secret;
obtaining the encrypted index associated with the secret;
decrypting the encrypted index by using the first key;
decrypting the encrypted record by using the second key;
processing the expression against the index to obtain the location;
obtaining the encrypted record at the location from the core; and
decrypting the encrypted record by using the key associated with the secret to obtain the plaintext.

2. A data search method performed by a device comprising a computer usable medium that physically embodies a secret, an identity, and an encrypted secret, wherein the method overwrites the identity and the secret from the medium after performing the steps of:

processing a plaintext to obtain a core and an index, wherein the index is coupled with a location within the core;
encrypting the index;
encrypting the plaintext to obtain an encrypted record;
registering the encrypted record into the core at the location;
associating a key with decrypting the encrypted record and decrypting the encrypted index;
associating the secret with the key, the encrypted index, and the core;
encrypting the secret;
associating a first user-key with decryption of the encrypted secret;
associating the identity with the first user-key;
authenticating the first user-key by using the identity;
obtaining the encrypted secret associated with the first user-key;
obtaining the secret by decrypting the encrypted secret with the first user-key;
associating a second user-key with the decryption;
associating a second identity with the second user-key;
authenticating the second user-key by using the second identity;
obtaining the encrypted secret associated with the second user-key; and
obtaining the secret by decrypting the encrypted secret with the second user-key.

3. A computer system for searching of encrypted data records, the computer system comprising:
A processor(s) set; and
A computer readable storage medium;
Wherein:
The processor set is structured, located, connected and/or programmed to run computer readable program code physically embodied on the computer usable medium; and
The computer readable program code is programmed to perform the steps of:
providing a secret and a plaintext;
processing the plaintext to obtain a core and an index, wherein the index is coupled with a location within the core;
encrypting the index;
encrypting the plaintext to obtain an encrypted record;
registering the encrypted record into the core at the location;
associating a key with decrypting the encrypted record and decrypting the encrypted index; and
associating the secret with the key, the encrypted index, and the core.

* * * * *